(12) United States Patent
Hiroi

(10) Patent No.: US 10,133,891 B2
(45) Date of Patent: Nov. 20, 2018

(54) PORTABLE TERMINAL, DATA COMMUNICATION SYSTEM, DATA COMMUNICATION METHOD AND PROGRAM

(71) Applicant: NEC Display Solutions, Ltd., Tokyo (JP)

(72) Inventor: Toru Hiroi, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 15/535,680

(22) PCT Filed: Jan. 8, 2015

(86) PCT No.: PCT/JP2015/050356
§ 371 (c)(1),
(2) Date: Jun. 13, 2017

(87) PCT Pub. No.: WO2016/110976
PCT Pub. Date: Jul. 14, 2016

(65) Prior Publication Data
US 2017/0344768 A1    Nov. 30, 2017

(51) Int. Cl.
*G06K 7/08* (2006.01)
*G06K 19/06* (2006.01)
(Continued)

(52) U.S. Cl.
CPC ..... *G06K 7/10336* (2013.01); *G06K 7/10009* (2013.01); *G06K 7/10118* (2013.01); *G06K 19/0727* (2013.01); *H05K 999/99* (2013.01)

(58) Field of Classification Search
USPC ........................................ 235/385, 451, 492
See application file for complete search history.

(56) References Cited

U.S. PATENT DOCUMENTS

| | | | |
|---|---|---|---|
| 2008/0231420 A1* | 9/2008 | Koyama | G01S 5/14 340/10.1 |
| 2009/0060395 A1* | 3/2009 | Weiss | G06Q 20/10 382/313 |

(Continued)

FOREIGN PATENT DOCUMENTS

| | | |
|---|---|---|
| JP | 2012-208771 A | 10/2012 |
| JP | 2014-053028 A | 3/2014 |
| JP | 2014-142721 A | 8/2014 |

OTHER PUBLICATIONS

Machine translation of JP2012208771, Dec. 20, 2017, 26 pages.*
International Search Report (ISR) (PCT Form PCT/ISA/210), in PCT/JP2015/050356, dated Apr. 7, 2015.

*Primary Examiner* — Tuyen K Vo
(74) *Attorney, Agent, or Firm* — McGinn I.P. Law Group, PLLC.

(57) ABSTRACT

A portable terminal includes a wireless communication unit configured to perform data communication with a wireless tag in a non-contact manner, a position determination unit configured to determine a position of the portable terminal, a control unit configured to generate guide information for guiding the portable terminal to a communicable area where communication with the wireless tag is enabled on the basis of the position determined by the position determination unit if communication is disabled when communication with the wireless tag is performed, and a display unit configured to display the generated guide information.

19 Claims, 8 Drawing Sheets

(51) Int. Cl.
  *G06K 7/10*    (2006.01)
  *G06K 19/07*   (2006.01)

(56) References Cited

U.S. PATENT DOCUMENTS

| | | | |
|---|---|---|---|
| 2009/0121873 A1* | 5/2009 | Park | G06Q 10/06 340/572.1 |
| 2009/0236410 A1* | 9/2009 | Noda | G06K 7/0008 235/375 |
| 2010/0141450 A1* | 6/2010 | Nagai | G01S 11/06 340/572.1 |
| 2010/0289624 A1* | 11/2010 | Nakamura | G01S 3/046 340/10.3 |
| 2013/0099919 A1* | 4/2013 | Cai | G01S 5/0009 340/539.13 |
| 2014/0134955 A1* | 5/2014 | Honda | G01S 5/02 455/67.11 |

* cited by examiner

PORTABLE TERMINAL, DATA COMMUNICATION SYSTEM, DATA COMMUNICATION METHOD AND PROGRAM

TECHNICAL FIELD

The present invention relates to a portable terminal, a data communication system, a data communication method, and a program.

BACKGROUND ART

At present, there is a wireless communication technology called short-range wireless communication having a short arrival distance from several cm to about 1 m. There also exists a technique of performing mutual communication between devices using short-range wireless communication by bringing a reader and a writer for reading and writing data of a wireless tag (hereinafter referred to as a radio frequency (RF) tag) in a non-contact manner close to an RF tag for reading and writing data of an embedded memory in a non-contact manner.

Also, Patent Document 1 discloses a technique of specifying position information and reading direction information when reading an RF tag and reporting guide information of an object to which the RF tag is attached on the basis of previous reading position information and previous reading direction information.

PRIOR ART DOCUMENT

Patent Documents

Patent Document 1: Japanese Unexamined Patent Application, First Publication No. 2014-53028

DISCLOSURE OF INVENTION

Problems to be Solved by the Invention

Because a wireless communication distance is short in short-range wireless communication, it is necessary to bring an RF tag close to antennas of a reader and writer while performing data communication. Therefore, when large-volume data communication is performed and a communication time is long, it is necessary for a user to fix the RF tag close to the reader and the writer for a long time and pay attention so that they do not deviate from a communicable area during data communication.

Also, a portable terminal having reader and writer functions may not have a mark indicating a position of an antenna of an embedded RF tag from a viewpoint of design. Likewise, a data terminal with an embedded RF tag may not have a mark indicating a position of the embedded RF tag. When there is no mark indicating the position of the antenna of the RF tag or the position of the RF tag, it is necessary for the user to ascertain the positions of the RF tag embedded in the data terminal and the antenna embedded in the portable terminal and then adjust the two positions. Then the user needs to continuously fix the portable terminal so that it is maintained within a communicable area while data communication is being performed. Here, if the user moves the portable terminal during the data communication, the portable terminal may deviate from the communicable area and the data communication may be interrupted. In this manner, if the data communication is interrupted, the user needs to precisely perform alignment again, make the RF tag embedded in the data terminal and the antenna embedded in the portable terminal opposed to each other in proximity, and start data communication.

Also, in the technology shown in Patent Document 1, guide information is displayed on the basis of previous reading position information and previous reading direction information to indicate a direction or a position of an object to which an RF tag is attached. In the technology shown in Patent Document 1, when the user moves the portable terminal during data communication and the data communication is interrupted, it is difficult to guide the user in real time so that the portable terminal is located at a position where data communication is enabled.

A problem observed in the present invention is that it is difficult for a user to align a data terminal and a portable terminal again when the data terminal and the portable terminal deviate from a communicable area during data communication.

Means for Solving the Problem

According to an aspect of the present invention in view of the above-described problem, a portable terminal includes a wireless communication unit configured to perform data communication with a wireless tag in a non-contact manner; a position determination unit configured to determinate a position of the portable terminal; a control unit configured to generate guide information for guiding the portable terminal to a communicable area where communication with the wireless tag is enabled on the basis of the position determined by the position determination unit if communication is disabled when the communication with the wireless tag is performed; and a display unit configured to display the generated guide information.

Also, according to an aspect of the present invention, a portable terminal includes a wireless communication unit configured to perform data communication with a wireless tag in a non-contact manner; an acceleration determination unit configured to determinate acceleration of the portable terminal; a control unit configured to generate guide information for guiding the portable terminal to a communicable area where communication with the wireless tag is enabled on the basis of the acceleration determined by the acceleration determination unit if communication is disabled when communication with the wireless tag is performed; and a display unit configured to display the generated guide information.

Also, according to an aspect of the present invention, there is provided a data communication system including a wireless tag from and to which information is read and written in a non-contact manner and a portable terminal having a function of recording and reading data to and from the wireless tag, the portable terminal including: a wireless communication unit configured to perform data communication with the wireless tag in the non-contact manner; a position determination unit configured to determinate a position of the portable terminal; a control unit configured to generate guide information for guiding the portable terminal to a communicable area where communication with the wireless tag is enabled on the basis of the position determined by the position determination unit if communication is disabled when communication with the wireless tag is performed; and a display unit configured to display the generated guide information.

Also, according to an aspect of the present invention, there is provided a data communication method for communicating data between a wireless tag from and to which information is read and written in a non-contact manner and a portable terminal having a function of recording and reading data to and from the wireless tag, the data communication method including: determining a position of the portable terminal; generating guide information for guiding the portable terminal to a communicable area where communication with the wireless tag is enabled on the basis of the determined position if communication is disabled when communication with the wireless tag is performed; and displaying the generated guide information.

Also, according to an aspect of the present invention, there is provided a program for causing a computer, which records and reads data to and from a wireless tag from and to which information is able to be read and written in a non-contact manner, to execute the steps of: determining a position of a portable terminal; generating guide information for guiding the portable terminal to a communicable area where communication with the wireless tag is enabled on the basis of the determined position if communication is disabled when communication with the wireless tag is performed; and displaying the generated guide information on a display unit.

Effects of the Invention

According to the present invention, if data communication between a portable terminal and a data terminal is disabled, a display unit displays guide information for guiding the portable terminal to a communicable area on the basis of a position determined by a position determination unit of the portable terminal. This allows a user to move the portable terminal while viewing the guide information on the display unit so that it is possible to efficiently return a position of the portable terminal to within the communicable area even when the portable terminal has deviated from the communicable distance during the data communication.

EMBODIMENTS FOR CARRYING OUT THE INVENTION

Hereinafter, embodiments of the present invention will be described with reference to the drawings.

First Embodiment

Figure 1:
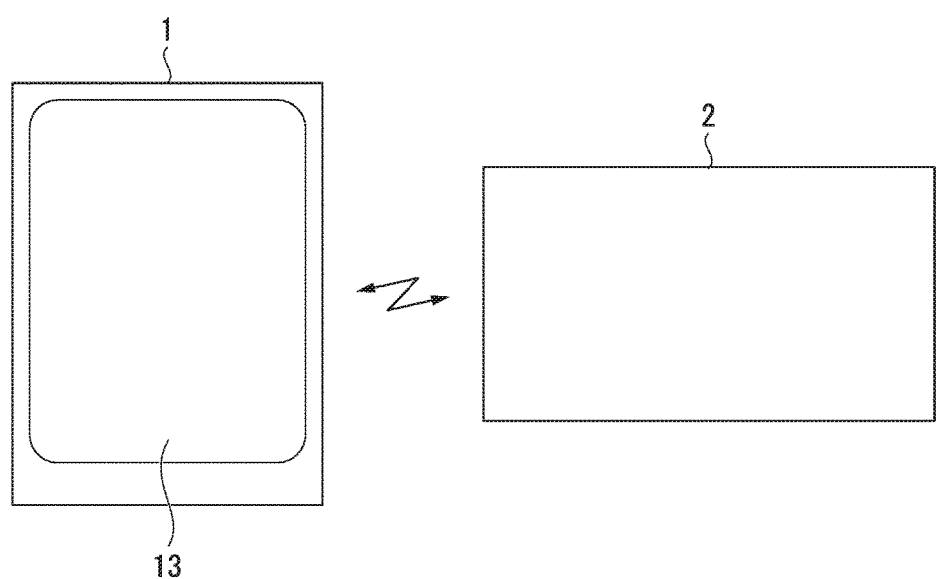
FIG. 1 is a schematic diagram showing a configuration of a data communication system according to a first embodiment of the present invention.

FIG. 1 is a schematic diagram showing a configuration of a data communication system according to the first embodiment of the present invention. As shown in FIG. 1, the data communication system according to the first embodiment of the present invention includes a portable terminal 1 and a data terminal 2.

The portable terminal 1 has a reader function and a writer function of an RF tag. For example, a portable wireless communication device such as a mobile phone, a smartphone, a tablet, or a portable game machine is used as the portable terminal 1. The data terminal 2 has a radio frequency (RF) tag. For example, an integrated circuit (IC) card, a personal computer, a cellular phone, and a display are used as the data terminal 2. The RF tag stores, for example, setting data of the data terminal 2 and the like. Data communication can be performed between the portable terminal 1 and the RF tag of the data terminal 2 using short-range wireless communication.

Figure 2:
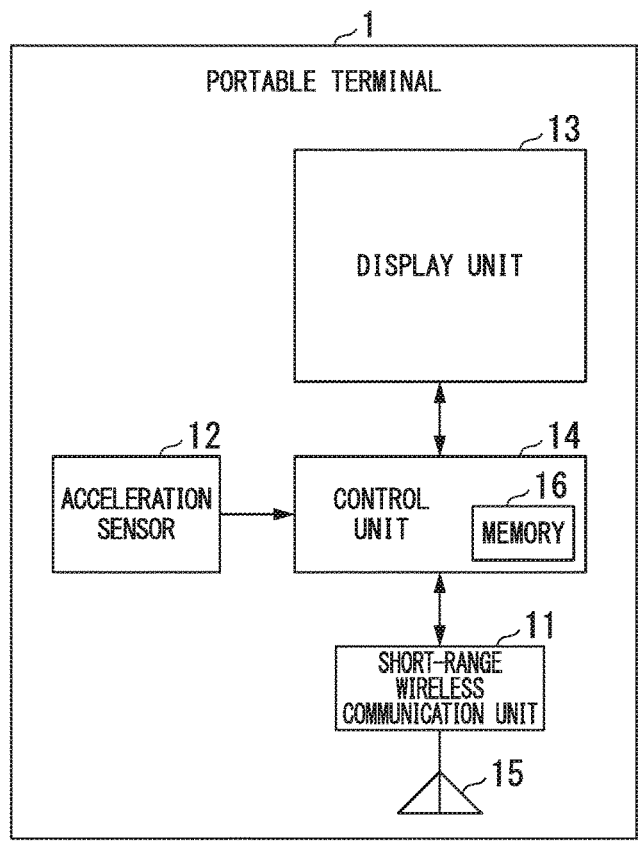
FIG. 2 is a block diagram showing schematic configurations of a portable terminal and a data terminal according to the first embodiment of the present invention.
Figure 2:
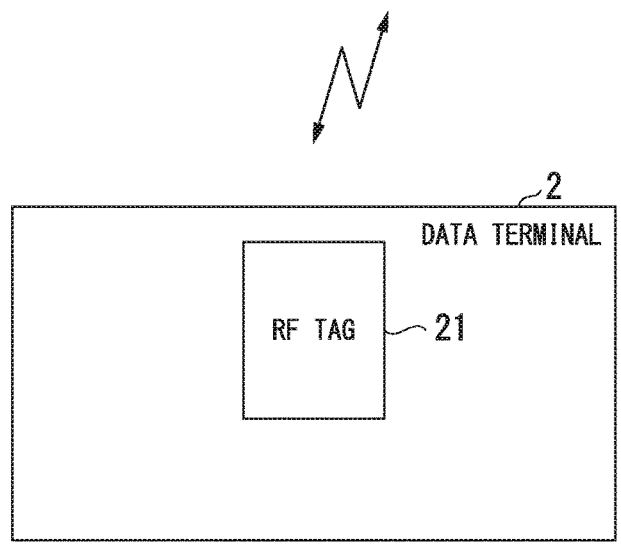

FIG. 2 is a block diagram showing schematic configurations of the portable terminal 1 and the data terminal 2. FIG. 2 shows the schematic configuration of the portable terminal 1 and shows the schematic configuration of the data terminal 2.

As shown in FIG. 2, the portable terminal 1 includes a short-range wireless communication unit 11, an acceleration sensor 12, a display unit 13, a control unit 14, and the like.

The short-range wireless communication unit 11 realizes the reader function and the writer function of the RF tag. The short-range wireless communication unit 11 is provided with an antenna 15. A coil antenna can be used as the antenna 15. Also, the antenna 15 is embedded in, for example, the portable terminal 1.

The acceleration sensor 12 determinates acceleration of the portable terminal 1 when it moves. An acceleration sensor for measuring acceleration of three axes of an x-axis (a predetermined direction of the portable terminal 1, for example, a lateral direction parallel to a display surface of the display unit of the portable terminal 1), a y-axis (a direction perpendicular to the x-axis, for example, a vertical direction parallel to the display surface of the display unit of the portable terminal 1), and a z-axis (a direction perpendicular to the x-axis and the y-axis, for example, a depth direction toward the display surface provided in the display unit of the portable terminal 1) is used as the acceleration sensor 12. The acceleration sensor 12 is a position determination unit that determines a position of the portable terminal 1 and, more specifically, determines displacement from a position where communication of the portable terminal 1 and the data terminal 2 (the wireless tag) is enabled.

The display unit 13 includes, for example, a touch panel type display or the like. When the portable terminal 1 has deviated from the communicable area, guide information for guiding the portable terminal 1 to the communicable area is displayed on the display of the display unit 13 on the basis of displacement of each axis obtained based on a measured value of the acceleration sensor 12. For example, a guide screen including a character string, a graphic or the like representing explanation content for guidance to the communicable area can be used as the guide information.

The control unit 14 includes a central processing unit (CPU) and a memory and controls the entire portable terminal 1. The memory 16 of the control unit 14 stores a computer program for realizing the first embodiment of the present invention. In the first embodiment of the present invention, the control unit 14, by executing this computer program, performs a process of calculating a displacement of each axis on the basis of a measured value of acceleration from the acceleration sensor 12 and generating a guide screen for guiding the portable terminal 1 to the communicable area. That is, if communication is disabled when communication with the data terminal 2 (an RF tag 21) is performed, the control unit 14 generates guide information for guiding the portable terminal 1 to the communicable area where communication with the data terminal 2 is enabled on the basis of a determination result determined by the acceleration sensor 12.

As shown in FIG. 2, the data terminal 2 includes the RF tag 21. The RF tag 21 is a wireless tag for exchanging data using short-range wireless communication. The RF tag 21 is embedded in, for example, the data terminal 2.

By bringing the antenna 15 of the portable terminal 1 and the RF tag 21 of the data terminal 2 close to each other, data communication can be performed between the short-range wireless communication unit 11 of the portable terminal 1 and the RF tag 21 of the data terminal 2. In the reader function of the short-range wireless communication unit 11, desired data is read from the RF tag 21 and this data is received by the short-range wireless communication unit 11 via the antenna 15. In the writer function, desired data is transmitted from the short-range wireless communication unit 11, received by the RF tag 21 via the antenna 15, and written to the RF tag 21.

As described above, a guide screen for guiding the portable terminal to the communicable area is displayed on the display of the display unit 13. A process of generating such a guide screen will be described.

Figure 3:
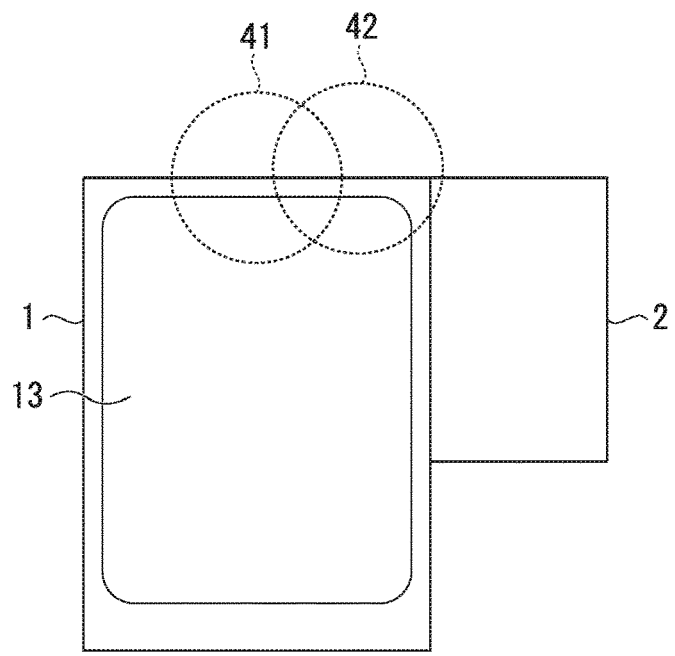
FIG. 3 is a diagram showing a communicable area when the portable terminal and the data terminal according to the first embodiment of the present invention perform data communication using short-range wireless communication.

FIG. 3 is a diagram showing a communicable area when the portable terminal 1 and the data terminal 2 perform data communication using short-range wireless communication. In FIG. 3, a communicable area 41 is a communicable area where the portable terminal 1 can perform data communication. A communicable area 42 is a communicable area where the data terminal 2 can perform data communication. The communicable area 41 of the portable terminal 1 and the communicable area 42 of the data terminal 2 overlap so that the short-range wireless communication unit 11 of the portable terminal 1 can read desired data from the RF tag 21 of the data terminal 2. Also, the short-range wireless communication unit 11 of the portable terminal 1 can write desired data to the RF tag 21 of the data terminal 2. The portable terminal 1 is assumed to be moved when the portable terminal 1 and the data terminal 2 are performing data communication using short-range wireless communication. At this time, if a positional relationship between the portable terminal 1 and the data terminal 2 deviates from a relationship in which the communicable area 41 and the communicable area 42 intersect, data communication between the portable terminal 1 and the RF tag of the data terminal 2 is not performed. In the case of short-range wireless communication, the communicable area 41 and the communicable area 42 are small and it is difficult to hold the portable terminal 1 in the communicable area.

Therefore, in the first embodiment of the present invention, when the portable terminal 1 is moved during the data communication and the data communication between the portable terminal 1 and the RF tag of the data terminal 2 is in a disabled state, the acceleration sensor 12 of the portable terminal 1 starts to measure acceleration of the portable terminal 1. In the first embodiment of the present invention, a displacement of the portable terminal 1 from a point in time at which communication with the RF tag of the data terminal 2 was disabled is calculated on the basis of a measured value of the acceleration. In the first embodiment of the present invention, guide information for guiding the portable terminal 1 to the communicable area is displayed on the display unit 13 on the basis of the obtained displacement. The user moves the portable terminal 1 while viewing the guide of the display unit 13 so that it is possible to efficiently return the position of the portable terminal 1 to within the communicable area even when the portable terminal 1 has deviated from the communicable distance during data communication.

That is, in the first embodiment of the present invention, when the communicable area 41 of the portable terminal 1 and the communicable area 42 of the data terminal 2 do not overlap (in the case of deviation from the communicable area) during data communication, the acceleration sensor 12 of the portable terminal 1 starts to measure acceleration of the x-axis, the y-axis, and the z-axis from that point in time. By integrating the measured acceleration of each axis by time twice at each fixed time, the displacement of each axis at each fixed time is obtained. The displacement of each axis of the portable terminal 1 from a position at a point in time at which communication was disabled is obtained by cumulatively adding the displacement at each fixed time for each axis. Once the displacement of each axis is obtained, a guide screen for guiding the portable terminal 1 to the communicable area can be generated on the basis of the displacement of each axis.

Figure 4:
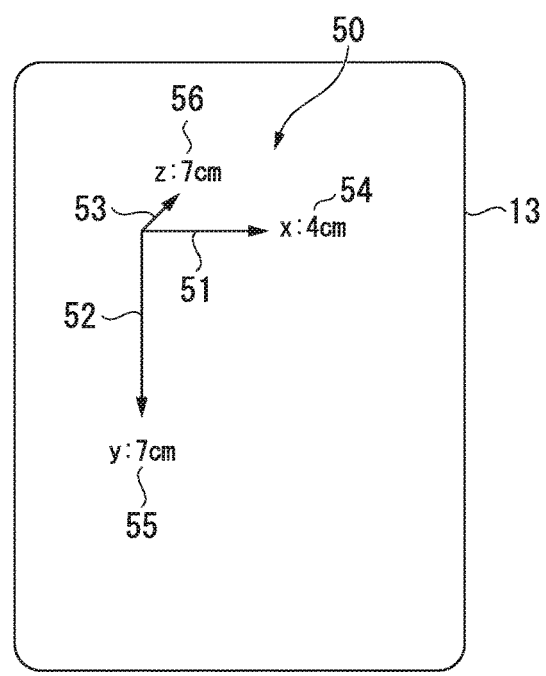
FIG. 4 is a diagram showing a guide screen according to the first embodiment of the present invention.

FIG. 4 is a diagram showing a guide screen 50. As shown in FIG. 4, the guide screen 50 includes arrow indicators 51 to 53 and distance indicators 54 to 56. The arrow indicator 51 indicates an x-axis direction toward the communicable area. The arrow indicator 52 indicates a y-axis direction toward the communicable area. The arrow indicator 53 indicates a z-axis direction toward the communicable area. The distance indicator 54 indicates a distance in the x-axis direction toward the communicable area. The distance indicator 55 indicates a distance in the y-axis direction toward the communicable area. The distance indicator 56 indicates a distance in the z-axis direction toward the communicable area.

The arrow indicator 51 in the x-axis direction, the arrow indicator 52 in the y-axis direction, and the arrow indicator 53 in the z-axis direction toward the communicable area are displayed to be opposite to the displacement of each axis acquired by the portable terminal 1. Also, the direction of each of the arrow indicators 51 to 53 is changed so that the direction toward the communicable area is always displayed, depending on a sign of the acquired displacement. Absolute values of displacement acquired of each axis are displayed as the distance indicator 54 in the x-axis direction, the distance indicator 55 in the y-axis direction, and the distance indicator 56 in the z-axis direction toward the communicable area.

Figure 5:
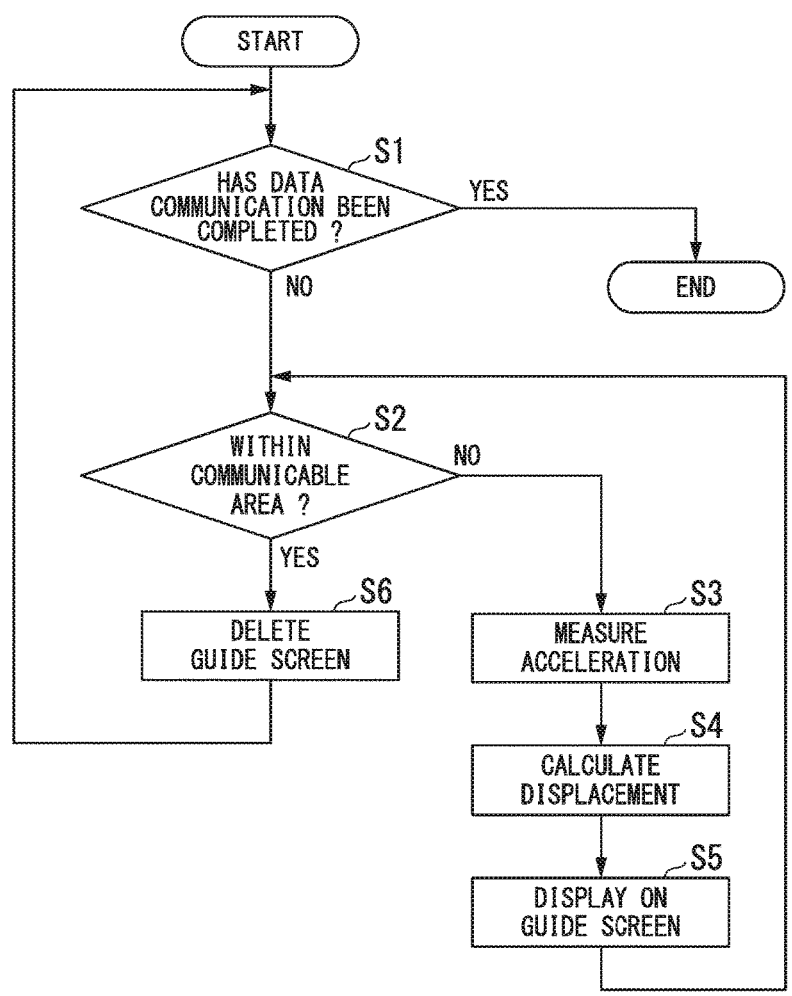
FIG. 5 is a flowchart showing a process of generating a guide screen in the first embodiment of the present invention.

FIG. 5 is a flowchart showing a process of generating a guide screen in the first embodiment of the present invention. In FIG. 5, the control unit 14 determines whether or not the data communication between the portable terminal 1 and the RF tag of the data terminal 2 has been completed (step S1). When the data communication has been completed (step S1: Yes), the control unit 14 terminates the process. On the other hand, when the data communication has not been completed (step S1: NO), the control unit 14 determines whether or not the data terminal 2 is within a communicable area (step S2). For example, when the control unit 14 communicates with the data terminal 2, the control unit 14 determines that the data terminal 2 has deviated from the communicable area if data communication is interrupted, such as when communication is disabled during communication, and determines that the data terminal 2 is within the communicable area if communication is established.

When the data terminal 2 is within the communicable area in step S2 (step S2: Yes), the control unit 14 deletes a display of a guide screen if the guide screen is displayed (step S6) and proceeds to step S1. If the guide screen is not displayed, the control unit 14 proceeds to step S1 in a state in which the guide screen is not displayed.

On the other hand, if the portable terminal 1 and the data terminal 2 are outside the communicable area in step S2 (step S2: No), the control unit 14 moves the process to step S3.

In step S3, the acceleration sensor 12 starts to measure acceleration of the x-axis, the y-axis, and the z-axis. Then, the control unit 14 calculates displacement of each axis from a position at a point in time at which communication was disabled on the basis of the acceleration measured by the acceleration sensor 12 (step S4). That is, by integrating the measured acceleration of each axis by time twice at each fixed time, the displacement of each axis at each fixed time is calculated. The displacement of each axis of the portable terminal 1 from the position at the point in time at which communication was disabled is calculated by cumulatively adding the displacement at each fixed time for each axis. Then, the control unit 14 causes the display unit 13 to display the guide screen 50 on the basis of the displacement of each axis calculated by the portable terminal 1 (step S5), and returns the process to step S2. In step S2, it is determined whether the position of the portable terminal 1 has returned to a position where the communicable area 41 of the portable terminal 1 and the communicable area 42 of the data terminal 2 overlap. If the position of the portable terminal 1 does not return to the position where the communicable area 41 of the portable terminal 1 and the communicable area 42 of the data terminal 2 overlap (step S2: No), the processing from step S2 to step S5 is iterated. If the position of the portable terminal 1 returns to the position where the communicable area 41 of the portable terminal 1 and the communicable area 42 of the data terminal 2 overlap in step S2 and the data communication between the portable terminal 1 and the RF tag of the data terminal 2 is enabled (step S2: Yes), the display of the guide screen is deleted (step S6).

As described above, in the first embodiment of the present invention, when the portable terminal 1 is moved during data communication and in a state in which communication is disabled, a displacement of the portable terminal from a position at a point in time at which communication with the RF tag of the data terminal 2 was disabled is calculated. On the basis of the calculated displacement, a guide screen for guiding the portable terminal 1 to a communicable area is displayed on the display of the display unit 13. Thereby, when the portable terminal 1 is moved and communication with the RF tag of the data terminal 2 cannot be performed, the user can easily return the portable terminal 1 to a position of the communicable area.

Second Embodiment

Figure 6:
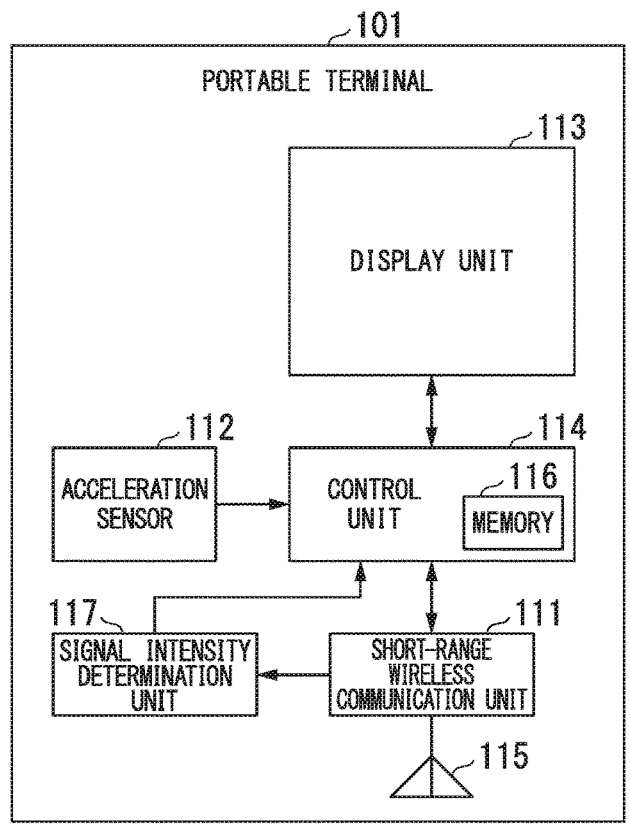
FIG. 6 is a block diagram showing schematic configurations of a portable terminal and a data terminal according to a second embodiment of the present invention.
Figure 6:
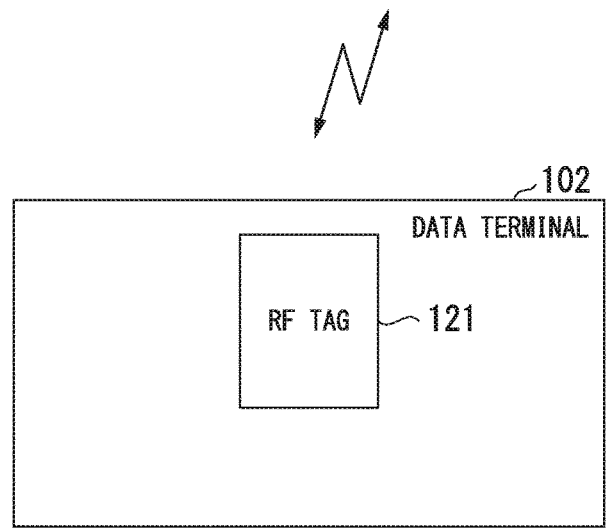

Next, the second embodiment of the present invention will be described. FIG. 6 is a block diagram showing schematic configurations of a portable terminal 101 and a data terminal 102 according to the second embodiment of the present invention. FIG. 6 is a schematic configuration of the portable terminal 101, and is a schematic configuration of the data terminal 102.

As shown in FIG. 6, the portable terminal 101 includes a short-range wireless communication unit 111, an acceleration sensor 112, a display unit 113, a control unit 114, and the like. These are similar to the short-range wireless communication unit 11, the acceleration sensor 12, the display unit 13, and the control unit 14 in the first embodiment. Further, a signal intensity determination unit 117 is provided in the portable terminal 101 in the second embodiment of the present invention. The signal intensity determination unit 117 determinates a received signal intensity of the short-range wireless communication unit 111. Also, the signal intensity determination unit 117 may be provided in the short-range wireless communication unit 111.

Also, the short-range wireless communication unit 111 is provided with an antenna 115. A computer program for realizing the second embodiment of the present invention is stored in a memory 116 of the control unit 114.

As shown in FIG. 6, the data terminal 102 includes an RF tag 121. This configuration is similar to that of the RF tag 21 of the data terminal 2 in the first embodiment.

In the second embodiment of the present invention, if data communication is started between the portable terminal 101 and the data terminal 102, the control unit 114 of the portable terminal 101 causes measurement of a signal intensity by the signal intensity determination unit 117 and measurement of acceleration of the x-axis, the y-axis, and the z-axis by the acceleration sensor 112 to be started. A time at which data communication is started is assumed to be T0. The signal intensity and the acceleration are measured every fixed time $\Delta T$ from the time T0 and are stored in the control unit 114. By integrating the acceleration measured every fixed time $\Delta T$ by the time $\Delta T$ twice, displacement of each axis at each fixed time can be obtained. A time at which the portable terminal 101 is present at a position serving as a starting point of the displacement is assumed to be a starting point time Ts. An initial value of Ts is a time at which acceleration was first acquired after the activation of the acceleration sensor 112. The displacement of the portable terminal from the starting point time Ts to a time Tn can be obtained by cumulatively adding displacement every fixed time $\Delta T$ until the time Tn for each axis.

Here, the maximum value of the signal intensity is assumed to be Smax. An initial value of the maximum value Smax of the signal intensity is a signal intensity Ss measured at the starting point time Ts of data communication. When the signal intensity Sn measured at the time Tn (Tn>Ts) is greater than a signal intensity S(n−1) measured at a time T(n−1), the maximum value Smax of the signal intensity is updated as Smax=Sn. If the maximum value Smax of the signal intensity is updated, displacement acquired so far is deleted. Using a position of the portable terminal 101 acquiring the maximum value Smax of the signal intensity as a position Pmax where the signal intensity is maximized and using a time at which the maximum value Smax is acquired as the starting point time Ts, the acquisition of displacement is resumed using the measured value of the acceleration sensor 112.

By moving the portable terminal 101 during data communication, a guide screen is displayed on the display unit 113 of the portable terminal 101 from a point in time at which a communicable area of the portable terminal 101 and a communicable area of the data terminal 102 do not overlap (a point in time at which the portable terminal 101 deviates from the communicable area). In the second embodiment of the present invention, a guide for guiding the portable terminal 101 to a position where the signal intensity is maximized is displayed on the display unit 113.

Figure 7:
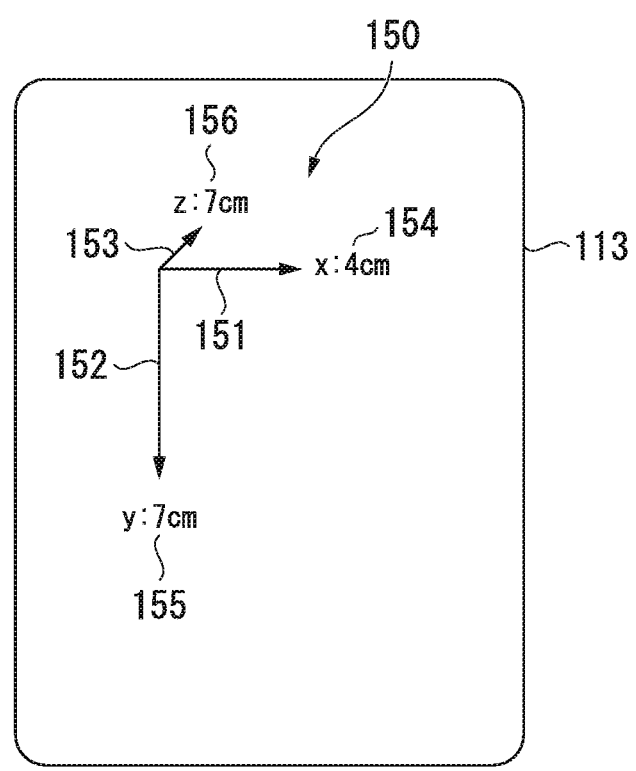
FIG. 7 is a diagram showing a guide screen according to the second embodiment of the present invention.

That is, FIG. 7 is a diagram showing a guide screen 150 according to the second embodiment of the present invention. As shown in FIG. 7, the guide screen 150 includes arrow indicators 151 to 153 and distance indicators 154 to 156. The arrow indicator 151 indicates an x-axis direction toward a position where the signal intensity is maximized. The arrow indicator 152 indicates a y-axis direction toward the position where the signal intensity is maximized. The arrow indicator 153 indicates a z-axis direction toward the position where the signal intensity is maximized. The distance indicator 154 indicates a distance in the x-axis direction toward the position where the signal intensity is maximized. The distance indicator 155 indicates a distance in the y-axis direction toward the position where the signal intensity is maximized. The distance indicator 156 indicates a distance in the z-axis direction toward the position where the signal intensity is maximized.

The directions of the arrow indicator 151, the arrow indicator 152, and the arrow indicator 153 toward the position Pmax where the signal intensity is maximized are directions opposite to the displacement of axes acquired by the portable terminal 101. Also, the directions of the arrow indicators 151 to 153 are changed depending on a sign of the acquired displacement so that a direction in which the signal intensity is maximized is always displayed. Also, the distance indicator 154 in the x-axis direction, the distance indicator 155 in the y-axis direction, and the distance indicator 156 in the z-axis direction indicate absolute values of displacement acquired in the axes.

Figure 8:
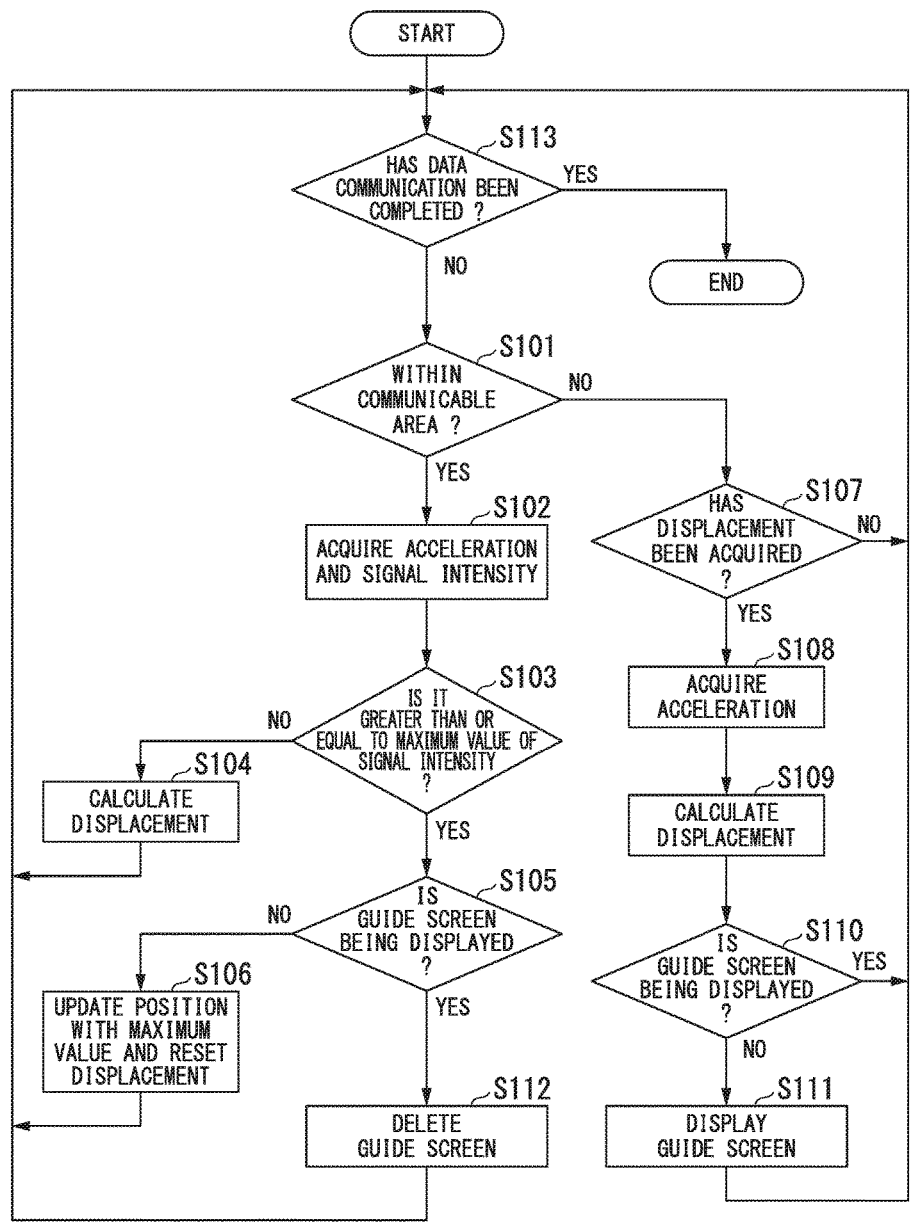
FIG. 8 is a flowchart showing a process of generating a guide screen in the second embodiment of the present invention.

FIG. 8 is a flowchart showing a process of generating a guide screen in the second embodiment of the present invention. In FIG. 8, the control unit 114 determines whether or not data communication between the portable terminal 101 and the RF tag of the data terminal 102 has been completed (step S113). When the data communication has been completed (step S103: Yes), the control unit 114 terminates the process. On the other hand, when the data communication has not been completed (step S113: NO), the control unit 114 determines whether or not the data terminal 102 is within a communicable area (step S101).

When it is determined that the data terminal 102 is within the communicable area (step S101: Yes), the control unit 114 acquires measured values of acceleration of the x-axis, the y-axis, and the z-axis from the acceleration sensor 112 and also acquires a measured value of a signal intensity from the signal intensity determination unit 117 (step S102).

Next, the control unit 114 determines whether or not the signal intensity acquired in step S102 is greater than or equal to a maximum value of signal intensities acquired so far (step S103). When the acquired signal intensity is not greater than or equal to the maximum value of the signal intensities acquired so far (step S103: No), the control unit 114 calculates displacement of each axis from a position where the signal intensity of the portable terminal 101 is maximized on the basis of the measured value of the acceleration sensor 112 (step S104). Then, the control unit 114 returns the process to step S101.

When the acquired signal intensity is greater than or equal to the maximum value of the signal intensities acquired so far (step S103: Yes), the control unit 114 determines whether or not a guide screen is being displayed (step S105). If the guide screen is not being displayed (step S105: No), the control unit 114 updates a position where the signal intensity is maximized with a present acquisition position, resets the displacement of each axis of the portable terminal 101 (step S106), and returns the process to step S101.

By iterating the processing from step S101 to step S106, a position where the signal intensity is maximized is acquired in step S106 and a displacement of each axis from the position where the signal intensity of the portable terminal 101 is maximized is acquired in step S104.

If it is determined that the portable terminal 101 has deviated from the communicable area in step S101 (step S101: No), the control unit 114 determines whether or not the displacement of each axis from the position where the signal intensity of the portable terminal 101 is maximized has been acquired (step S107). If the displacement has not been acquired (step S107: No), the control unit 114 returns the process to step S101.

When the displacement has been acquired (step S107: Yes), the control unit 114 acquires measured values of acceleration of the x-axis, the y-axis, and the z-axis from the acceleration sensor 112 (step S108). Then, the control unit 114 calculates the displacement of each axis from the position where the signal intensity of the portable terminal 101 is maximized by cumulatively adding the displacement obtained based on the measured value of each axis acquired in step S108 to the displacement obtained in step S104 (step S109). Then, the control unit 114 determines whether or not the guide screen is being displayed (step S110). If the guide screen is not being displayed in step S110 (step S110: No), the control unit 114 displays the guide screen (step S111) and returns the process to step S101. When the guide screen is being displayed in step S110 (step S110: Yes), the control unit 114 returns the process to step S101.

In step S101, it is determined whether a position of the portable terminal 101 has returned to the communicable area of the portable terminal 101. If the position of the portable terminal 101 does not return to a position where the communicable area of the portable terminal 101 and the communicable area of the data terminal 102 overlap each other (step S101: No), the processing from step S107 to step S110 is iterated. Thereby, the displacement of each axis from the position where the signal intensity of the portable terminal 101 is maximized is displayed on the guide screen.

If it is determined that the position of the portable terminal 101 has returned to the position where the communicable area of the portable terminal 101 and the communicable area of the data terminal 102 overlap in step S101 (step S101: Yes), the control unit 114 moves the process to step S102. In step S102, the control unit 114 acquires a measured value of acceleration of each axis from the acceleration sensor 112 and acquires the signal intensity from the signal intensity determination unit 117. In step S103, the control unit 114 determines whether or not the signal intensity acquired in step S102 is greater than or equal to a maximum value of signal intensities acquired so far.

When the acquired signal intensity is not greater than or equal to the maximum value of the signal intensities acquired so far (step S103: No), the control unit 114 calculates displacement of each axis from a position where the signal intensity of the portable terminal 101 is maximized on the basis of the measured value of the acceleration sensor 112 (step S104). Thereby, the displacement of each axis from the position where the signal intensity of the portable terminal 101 is maximized is continuously displayed on the guide screen.

If the acquired signal intensity is greater than or equal to the maximum value of the signal intensities acquired so far (step S103: Yes), the display unit 113 determines whether or not the guide screen is being displayed (step S105). If the guide screen is being displayed (step S105: Yes), the control unit 114 deletes the guide screen (step S112) and terminates the process As described above, in the second embodiment of the present invention, a position where the signal intensity is maximized is determined. In the second embodiment of the present invention, when the portable terminal 101 is moved during data communication and is in a state in which communication is disabled, a displacement of the portable terminal 101 from a position where the signal intensity is maximized in the portable terminal 101 is calculated. In the second embodiment of the present invention, guide information for guiding the portable terminal 101 to a communicable area is displayed on the display of the display unit 113 on the basis of the obtained displacement. Thereby, when the portable terminal 101 is moved and communication with the data terminal 102 cannot be performed, a user can return the portable terminal 101 to an optimum position where the signal intensity is maximized.

Figure 9:
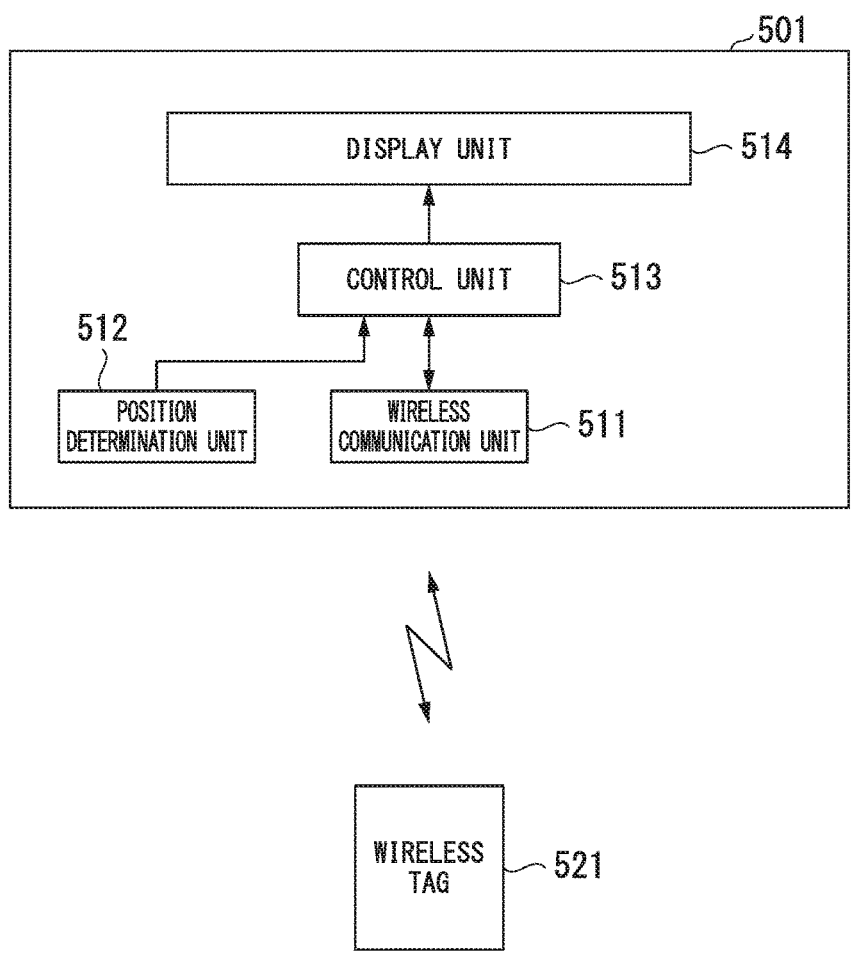
FIG. 9 is a schematic block diagram showing a basic configuration of a portable terminal according to the present invention.

FIG. 9 is a schematic block diagram showing a basic configuration of a portable terminal according to the present invention. As illustrated in FIG. 9, a portable terminal 501 according to the present invention includes a wireless communication unit 511, a position determination unit 512, a control unit 513, and a display unit 514 as basic components.

The wireless communication unit 511 performs data communication with a wireless tag 521 in a non-contact manner. The position determination unit 512 determines a position of the portable terminal 501. If data communication is disabled when communication with the wireless tag 521 is performed, the control unit 513 generates guide information for guiding the portable terminal 501 to a communicable area where communication with the wireless tag 521 is enabled on the basis of the position determined by the position determination unit 512. The display unit 514 displays the generated guide information. Thereby, by moving the portable terminal while the user views the guide of the display unit, it is possible to efficiently return the position of the portable terminal to within the communicable area even when the portable terminal 501 has deviated from the communicable distance during data communication.

The portable terminals 1, 101, and 501 described above have a computer system therein. The above-described operations of the processing units are stored in a computer-readable recording medium in the form of a program, and the above-described processes are performed by the computer reading and executing this program. Here, the computer-readable recording medium refers to a magnetic disc, a magneto-optical disc, a CD-ROM, a DVD-ROM, a semiconductor memory, or the like. Alternatively, the computer program may be distributed to a computer through a communication line, and the computer receiving the distributed computer program may execute the program.

Although either displacement of a portable terminal from a position at which communication with a RF tag of the data terminal 2 is disabled is obtained (calculated) or displacement of the portable terminal from a position where signal intensity is maximized in the portable terminal 101 is obtained on the basis of acceleration when the portable terminal is moved during data communication and is in a state in which communication is disabled in the first embodiment or the second embodiment of the present invention, the present invention is not limited thereto. For example, a position determination unit having a global positioning system (GPS) function of determining a position of the portable terminal instead of the acceleration sensor may be provided and a displacement of the portable terminal may be obtained on the basis of a position at which communication with the RF tag of the data terminal 2 is disabled and a current position of the portable terminal. Also, a displacement of the portable terminal 101 from a position where signal intensity is maximized in communication with the RF tag of the data terminal 102 may be obtained. Also, an acceleration determination unit including the acceleration sensor is an example of the position determination unit. Also, a relative position with the wireless tag may be obtained as the displacement of the portable terminal. That is, the portable terminal is configured to be guided to a communicable area where communication between the portable terminal and the wireless tag is enabled.

Also, the above-described program may be a program for implementing some of the above-described processes. Further, the above-described program may be a program capable of implementing the above-described processes in combination with a program already recorded on a computer system, i.e., a so-called differential file (differential program).

Although embodiments of the present invention have been described above with reference to the drawings, specific configurations are not limited to the embodiments, and a design or the like may also be included without departing from the scope of the present invention.

REFERENCE SYMBOLS 1, 101 Portable terminal
2, 102 Data terminal
11, 111 Short-range wireless communication unit
12, 112 Acceleration sensor
13, 113 Display unit
14, 114 Control unit
21, 121 RF tag

The invention claimed is:
1. A portable terminal comprising:
a memory that stores a program; and
a processor that executes the program;
wherein the processor is configured to:
perform data communication with a wireless tag in a non-contact manner,
determinate a position of the portable terminal;
generate, if communication with the wireless tag is disabled from a state where the communication is established before the data communication with the wireless tag is completed while the data communication is performed, guide information for guiding the portable terminal to a communicable area where the communication with the wireless tag is enabled on a basis of the position that is determined; and
display the generated guide information.

2. The portable terminal according to claim 1, wherein the processor is configured to display the generated guide information if the communication with the wireless tag is disabled.

3. The portable terminal according to claim 1, wherein the processor is configured to generate the guide information on a basis of displacement from a position where the communication with the wireless tag is disabled.

4. The portable terminal according to claim 3, wherein the processor is configured to determine acceleration when the portable terminal moves and obtains the displacement of the portable terminal on a basis of the determined acceleration.

5. The portable terminal according to claim 1, wherein the processor is configured to:
   determine an intensity of a signal received in performing the data communication with the wireless tag; and
   determine the guide information on the basis of displacement from a position where the intensity of the signal that is determined is maximized.

6. The portable terminal according to claim 1, wherein the processor is configured to generate the guide information when the wireless tag is disabled after the communication is established.

7. The portable terminal according to claim 1, wherein the processor is configured to generate, if communication with the wireless tag is disabled during the communication from the state where the communication is established before the data communication with the wireless tag is completed while the data communication is performed, the guide information for guiding the portable terminal to the communicable area where the communication with the wireless tag is enabled on the basis of the position that is determined.

8. A portable terminal comprising:
   a memory that stores a program; and
   a processor that executes the program;
   wherein the processor is configured to:
      perform data communication with a wireless tag in a non-contact manner;
      determine acceleration of the portable terminal;
      generate, if communication with the wireless tag is disabled from a state where the communication is established before the data communication with the wireless tag is completed while the data communication is performed, guide information for guiding the portable terminal to a communicable area where the communication with the wireless tag is enabled on a basis of the acceleration that is determined; and
      display the generated guide information.

9. The portable terminal according to claim 8, wherein the processor is configured to generate the guide information when the wireless tag is disabled after the communication is established.

10. The portable terminal according to claim 8, wherein the processor is configured to generate, if communication with the wireless tag is disabled during the communication from the state where the communication is established before the data communication with the wireless tag is completed while the data communication is performed, the guide information for guiding the portable terminal to the communicable area where the communication with the wireless tag is enabled on the basis of the position that is determined.

11. A data communication system comprising:
   a wireless tag from and to which information is read and written in a non-contact manner; and
   a portable terminal having a function of recording and reading data to and from the wireless tag,
   wherein the portable terminal includes:
      a memory that stores a program; and
      a processor that executes the program;
      wherein the processor is configured to:
         perform data communication with the wireless tag in the non-contact manner;
         determine a position of the portable terminal;
         generate, if a communication with the wireless tag is disabled from a state where the communication is established before the data communication with the wireless tag is completed while the data communication is performed, guide information for guiding the portable terminal to a communicable area where the communication with the wireless tag is enabled on a basis of the position that is determined; and
         display the generated guide information.

12. The data communication system of claim 11, wherein the processor is configured to generate the guide information when the wireless tag is disabled after the communication is established.

13. The data communication system of claim 11, wherein the processor is configured to generate, if communication with the wireless tag is disabled during the communication from the state where the communication is established before the data communication with the wireless tag is completed while the data communication is performed, the guide information for guiding the portable terminal to the communicable area where the communication with the wireless tag is enabled on the basis of the position that is determined.

14. A data communication method for communicating data between a wireless tag and a portable terminal, the data communication method comprising:
   determining a position of the portable terminal having a function of recording and reading data to and from the wireless tag in a non-contact manner;
   generating, if communication with the wireless tag is disabled from a state where the communication is established before the data communication with the wireless tag is completed while the data communication is performed, guide information for guiding the portable terminal to a communicable area where the communication with the wireless tag is enabled on a basis of the determined position; and
   displaying the generated guide information.

15. The data communication method of claim 14, wherein the generating generates the guide information when the wireless tag is disabled after the communication is established.

16. The data communication method of claim 14, wherein the generating generates, if communication with the wireless tag is disabled during the communication from the state where the communication is established before the data communication with the wireless tag is completed while the data communication is performed, the guide information for guiding the portable terminal to the communicable area where the communication with the wireless tag is enabled on the basis of the position that is determined.

17. A non-transitory computer-readable recording medium storing a program that causes a computer to execute:
   determining a position of a portable terminal that records and reads data to and from a wireless tag in a non-contact manner;
   generating, if communication with the wireless tag is disabled from a state where the communication is established before the data communication with the wireless tag is completed while the data communication is performed, guide information for guiding the portable terminal to a communicable area where the communication with the wireless tag is enabled on a basis of the determined position; and
   displaying the generated guide information.

18. The non-transitory computer-readable recording medium of claim 17, wherein the program causes the computer to further execute generating the guide information when the wireless tag is disabled after the communication is established.

19. The non-transitory computer-readable recording medium of claim 17, wherein the program causes the computer to further execute generating, if communication with the wireless tag is disabled during the communication from the state where the communication is established before the data communication with the wireless tag is completed while the data communication is performed, the guide information for guiding the portable terminal to the communicable area where the communication with the wireless tag is enabled on the basis of the position that is determined.

* * * * *